G. N. WILLIAMS, Jr. & J. WEGNER.
CAP PLATE FOR CYLINDRICAL SAW BLADES AND THE ATTACHMENT
OF THE SAW BLADE THERETO.
APPLICATION FILED AUG. 15, 1907.
922,649.
Patented May 25, 1909.
2 SHEETS—SHEET 1.
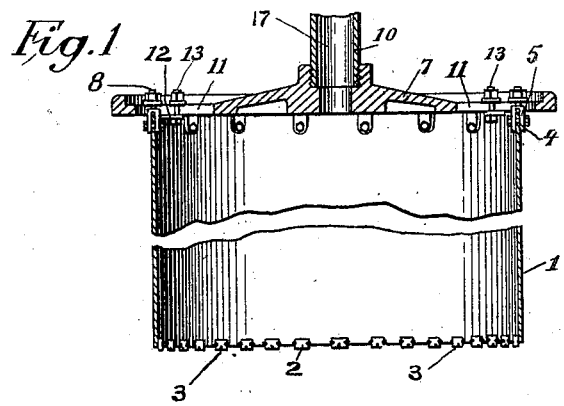
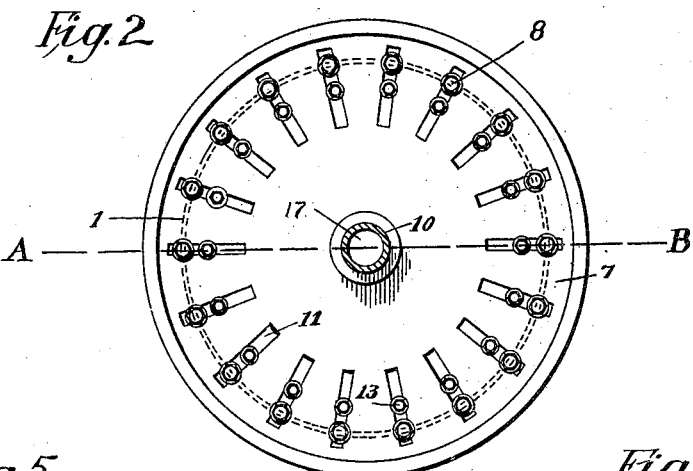
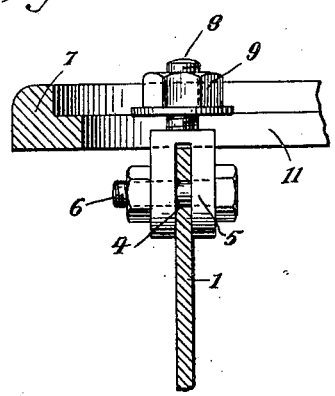
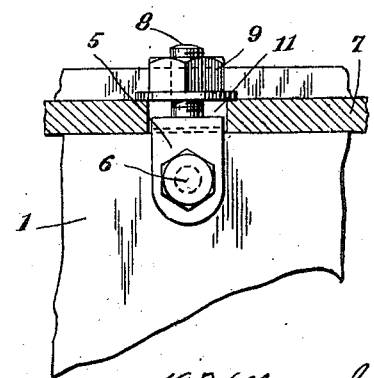
Attest:
Willis H. Heath
James D. K. Lee
George N. Williams Jr.
Julius Wegner Inventors
Chas. C. Prather
by Att'y., G. N. WILLIAMS, Jr. & J. WEGNER.
CAP PLATE FOR CYLINDRICAL SAW BLADES AND THE ATTACHMENT
OF THE SAW BLADE THERETO.
APPLICATION FILED AUG. 15, 1907.
922,649.  Patented May 25, 1909.
2 SHEETS—SHEET 2.
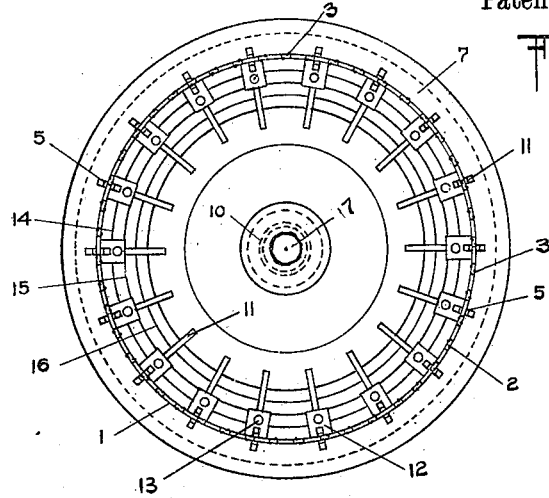
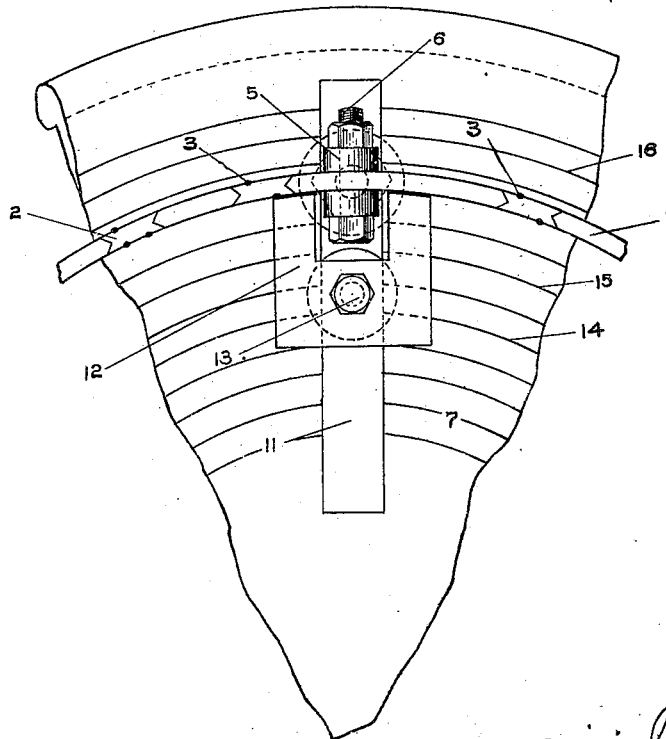
WITNESSES:  INVENTORS
  BY
  ATTORNEY

UNITED STATES PATENT OFFICE.

GEORGE N. WILLIAMS, JR., AND JULIUS WEGNER, OF NEW YORK, N. Y., ASSIGNORS TO SAID WILLIAMS.

CAP-PLATE FOR CYLINDRICAL SAW-BLADES AND THE ATTACHMENT OF THE SAW-BLADE THERETO.

No. 922,649.　　　Specification of Letters Patent.　　　Patented May 25, 1909.

Application filed August 15, 1907. Serial No. 388,718.

*To all whom it may concern:*

Be it known that we, GEORGE N. WILLIAMS, Jr., a citizen of the United States, residing in the borough of Manhattan, city, county, and State of New York, and JULIUS WEGNER, a citizen of Russia, and residing at Wegner, a citizen of Russia, and residing at Astoria, in the borough of Queens, in said city, have invented certain new and useful Improvements in Cap-Plates for Cylindrical Saw-Blades and in the Attachment of the Saw-Blade Thereto, of which the following is a specification.

The cylindrical saw-blade of our invention is adapted to cut cylindrical shapes from blocks of stone and other hard substances. Heretofore in cutting cylindrical shapes from stone the operation has been ordinarily performed by hand, by the use of the lathe, or, it has been limited to the production of narrow cylindrical forms (one foot or less in diameter) as by the use of the rotating annular drill. In the annular drill the cylindrical saw-blade or cutter is ordinarily held to its rotating spindle by means of a screw-cap, and, owing to the narrow diameter of the cylinder and the thickness of the metal of which it is composed in proportion thereto, (which tends to rigidity of form in the cylindrical saw-blade) substantially no assistance or reinforcement is needed by the saw-blade from the screw-cap or holder, for any purpose. The saw-blade of our invention however, which is adapted to cut such cylindrical blocks as are employed in the building up of columns for architectural work, is made of a single sheet of metal, by welding or otherwise, into the form of a hollow cylinder or enlarged annular drill, and owing to the diameter of the cylinder and the flexibility of the metal of which it is composed in proportion thereto, we have found that considerable assistance and reinforcement is desirable in the cap-plate or holder, not only in compelling evenness in the operation of the cutters at the edge of the saw-blade but also in centering the saw-blade, in assisting it to retain its circular form, and in forcing the blade against the stone in the operation of cutting in cases where pressure is employed; and, the object of our invention is to provide an improved cap-plate or holder for such saw-blade which will among other things as is hereinafter shown tend toward evenness in cutting and narrowness in the circular kerf in the stone, thus economizing in the use of diamonds or other cutters, also in waste of stone.

Our invention consists further in the employment of a multiplicity of holders for attachment of the cylindrical saw-blade, located at intervals about the circumference of one-edge thereof, to draw the blade at a number of different points tightly against the surface of the cap-plate, thereby serving to true and brace the blade; and whereby also the saw-blade is readily centered relative to the center of rotation of the cap-plate and one edge thereof maintained in circular form as hereafter described; and whereby, also substantial parallelism between the surface of the cap-plate and the cutting edge of the saw-blade is maintained.

Our invention consists also in a cap-plate provided with means whereby cylindrical saws of varying diameters may be readily adapted thereto in view of the diameter of the product desired.

Our invention consists further in the various combinations and constructions hereinafter described and claimed.

In the drawings which form part of this specification, Figure 1 is a cross section of the cap-plate and cylindrical saw-blade, through the line A—B of Fig. 2 showing the holders by which the saw blade is attached to the cap-plate and the stops which maintain the circular form of one edge of the saw blade. Fig. 2 is a plan view showing, with reference to Fig. 1 the upper surface of the cap plate. Fig. 3 is a plan view showing again with reference to Fig. 1 the under surface of the cap plate, Fig. 4 is an enlarged view of a portion of the edge of the cap plate showing a plan view of one of the stops indicated in Figs. 1 and 3. Figs. 5 and 6 are enlarged views of a portion of the cap plate and saw blade and of the holders shown in Fig. 1.

Referring now to Figs. 1, 2 and 3:—1 is a saw-blade which is made of a single sheet of metal by welding or otherwise into the form of a hollow cylinder. At one edge thereof called the cutting edge, are shown the teeth or cutters 2 armed with diamonds 3, inserted therein in the ordinary manner. At the other edge of the saw-blade are drilled perforations 4 for reception of the bolt of inverted U-shaped holders 5, which are shown holding one edge of the saw-blade tightly against the surface of the cap-plate 7, as hereafter described.

To attain substantial evenness in the action of the cutters at the cutting edge of the saw-blade—in other words to cause all the cutters to operate as nearly as possible in the same plane, the saw-blade is faced by grinding or otherwise so that the cutting edge is made parallel to the opposite edge, where it is to be drawn against the surface of the cap-plate. With this same object, among other things, the cap-plate 7 which consists of a circular plate adapted to be attached to rotating shaft 10 and to hold the cylindrical saw-blade is faced on one side thereof as nearly as may be in a true plane at right angles to the axis of rotation of shaft 10, for reception of the saw-blade. Perforations 4 receive bolts 6 of U-shaped holders 5 as shown in Figs. 5 and 6. Cap-plate 7 is slotted at 11 for reception of the thread screw 8 at the top of said U-shaped holders 5. Nut 9 with its washer on the other side of plate 7 is adapted to screw 8 of said U-shaped holders 5 as shown. In the drawings we have shown eighteen of these slots 11 arranged radially about the center of rotation of cap-plate 7, adapted to receive eighteen U-shaped holders 5 with their thread screws 8 and nuts 9 by means of which, placed as shown about the circumference of the cylindrical saw-blade, upon tightening said nuts 9 on thread screws 8 the faced edge of the saw-blade is tightly drawn at eighteen different points against the faced surface of cap-plate 7. Obviously more or less of these U-shaped holders 5 may be employed to firmly and tightly hold the saw-blade and brace it against the cap-plate 7. Enlarged views of said U-shaped holders 5 and the parts in contact are shown in Figs. 5 and 6. Slots 11 of cap-plate 7 adapt the cap-plate to the reception of saw-blades of different diameters in view of the length of said slots, because obviously the U-shaped holders 5 are, as shown, removable along said slots 11 toward or away from the center of rotation of cap-plate 7. Thus, for example, when all of said holders 5 are moved inward toward the center of rotation of the cap-plate they are adapted to hold and support a saw-blade in the cap-plate of a much less diameter than that shown in Fig. 2, and in the practical operation of the device in cutting columns for architectural work this availability in the same cap-plate for employment of any size cylindrical saw-blade within the limitations of the length of slots 11 is of substantial importance. So also obviously other means than slots 11 and holders 5 may be employed, our purpose being, among other things, that the cap-plate of our invention shall be supplied with holders which are readily adjustable relatively to the center of rotation of the cap-plate and thus adapted to the support of cylindrical saw-blades of different diameters, and we do not limit ourselves to the particular means here shown, viz.: slots 11 and holders 5, to accomplish this result.

Obviously other means may be employed than those here shown to draw the edge of the cylindrical saw-blade tightly against the surface of the cap-plate and to maintain it there, and we do not confine ourselves to the specific means here shown; viz:—slots 11 and U-shaped holders 5,—our purpose being among other things by employment of a multiplicity of holders, to draw the edge of the saw-blade at many different points about its circumference tightly against the faced surface of the cap-plate in order to reinforce the flexible blade toward evenness in the operation of the cutters at the edge thereof and to brace the blade against the stone in the operation of cutting in cases where pressure is employed.

To attain as nearly as possible a true circular motion in the cylindrical saw-blade as it rotates under the action of the rotating shaft 10 and cap-plate 7—in other words, to center the same as nearly as possible on the center of rotation of cap-plate 7 and to readily fix all parts of the circumference of the saw-blade at the same radial distance from said center of rotation, we have shown in the drawings one means by which the edge of the saw-blade next to the cap-plate is kept in circular form, viz., stops 12 one adapted to each of said slots 11. An enlarged view of stop 12, is shown in plan view in Fig. 4. Stop 12 consists of a flat plate of metal or other suitable material perforated for reception of screw bolts 13 and provided with two lugs or arms extending toward and bearing against the inner surface of the edge of the saw-blade next the cap-plate as shown.

In Fig. 3 are shown guide rings, 14, 15 and 16 which are cut or marked upon the faced surface of the cap-plate as convenient indexes or guides to the operator in setting stops 12. These guide rings, 14, 15 and 16 are each concentric with the center of rotation of cap-plate 7. Thus in adapting the saw-blade to its cap-plate the several stops 12 by means of their screw bolts 13, which serve to retain them in slots 11 are set with the assistance of guide rings 14, 15 and 16 at such equal radial distance from the center of cap-plate 7 as to adapt them accurately to the diameter of the saw-blade, whatever that may be. The saw blade is then placed against the faced surface of the cap-plate surrounding the several stops 12 and is drawn tightly against such faced surface by thread screws 8 and bolts 9 of holders 5, as already described. In the drawing we have shown eighteen of these stops 12, one adapted to each slot 11 of cap-plate 7. Obviously the number of stops 12 may be increased or decreased in view of the size of the cap-plate and the size and rigidity of form of the cylindrical saw-blade. Also obviously stops 12 may be placed externally to the surface of the cylindrical saw-blade and the latter drawn tightly against the surface of the cap-plate in circular form within said stops, without departing from the spirit of our invention. So also obviously other means may be employed than those here specifically shown, (stops 12 and guide rings 14, 15 and 16):—the purpose being to secure at one edge of the cylindrical saw-blade the substantially circular form of the cylinder and to also provide a means of readily centering cylindrical saws of various sizes on to the same cap-plate as desired. So also obviously we may dispense entirely with the use of the stops 12 and guide rings 14, 15 and 16 above referred to, and rely upon the accurate placing of the holders 5 in slots 11 at proper distances from the center of rotation of cap-plate 7 for the centering of the saw-blade, said holders 5 being radially removable relatively to the center of rotation of said cap-plate as above described, and we do not confine ourselves to a construction wherein stops or guide rings are employed.

Water is supplied within the cylindrical saw-blade by means of rotating shaft 10 which is made hollow at 17 for that purpose. It is, of course, understood that the cylindrical saw-blade to which our invention applies is adapted to cut the stone as other diamond stone saws—by the action of the diamonds or other hard substances in the teeth, rapidly moving upon the surface of the stone to be cut; and obviously in the case of this cylindrical saw-blade such action is to be attained by a rapid rotary motion of the cap-plate and its saw blade. The importance will therefore be obvious to one skilled in the art, of having all parts of the cutting edge of the tool travel as nearly as possible in the same plane and on the true arc of a circle, thereby diminishing the width of the kerf and the amount of work to be performed by the cutters. In the saw-blade we employ rectangular teeth 2, which are inserted at the edge of the blade in ordinary manner. The diamonds are indicated at 3. They are inserted in the teeth for the purpose of rapid cutting. Any other kind of teeth than diamond teeth, however, may be employed adapted to cut under the action of the rapid rotary motion. Also obviously the rotating cylindrical saw-blade with its cap-plate may be fed to the stone or the stone may be fed to the rotating saw-blade; also rotating shaft 10 may be mounted in any proper machine frame and rotary motion imparted thereto in any suitable manner.

We claim:—

1. The combination with a cylindrical saw-blade of a rotating cap-plate therefor, means whereby said cap-plate may be rotated and a multiplicity of holders disposed about the circumference of one edge of the saw-blade adapted to draw and hold said edge at a number of different points against the surface of the cap-plate.

2. The combination with a cylindrical saw-blade of a rotating cap-plate therefor, means whereby said cap-plate may be rotated, a multiplicity of holders disposed about the circumference of one edge of the saw-blade adapted to draw and hold said edge at a number of different points against the surface of the cap-plate and means supported by the cap-plate whereby said last named edge of the saw-blade is maintained in circular form.

3. The combination with a cylindrical saw-blade of a rotating cap-plate therefor, means whereby said cap-plate may be rotated, a multiplicity of holders disposed about the circumference of one edge of the saw-blade, adapted to draw and hold said edge at a number of different points against the surface of the cap-plate, means supported by the cap-plate whereby said last named edge of the saw-blade is maintained in circular form, and means supported by the cap-plate for readily centering the saw-blade on the center of rotation of the cap-plate.

4. The combination with a cylindrical saw-blade faced at both edges and having its cutting edge armed with teeth or cutters, of a rotating cap-plate faced upon one side, means whereby said cap-plate may be rotated and a multiplicity of holders disposed about the circumference of the other edge of the saw-blade adapted to draw and hold said edge at a number of different points against the faced surface of the cap-plate whereby substantial parallelism is maintained between the cutting edge of the saw-blade and the faced surface of the cap-plate.

5. The combination with a cylindrical saw-blade faced at both edges and having its cutting edge armed with teeth or cutters, of a rotating cap-plate faced upon one side, means whereby said cap-plate may be rotated, a multiplicity of holders disposed about the circumference of the other edge of the saw-blade adapted to draw and hold said edge at a number of different points against the faced surface of the cap-plate, and means supported by the cap-plate whereby said last named edge of the saw-blade is maintained in circular form.

6. The combination with a cylindrical saw-blade faced at both edges and having its cutting edge armed with teeth or cutters, of a rotating cap-plate faced upon one side, means whereby said cap-plate may be rotated, a multiplicity of holders disposed about the circumference of the other edge of the saw-blade adapted to draw and hold said edge at a number of different points against the faced surface of the cap-plate, means supported by the cap-plate whereby said last named edge of the saw-blade is maintained in circular form and means supported by the cap-plate for readily centering the saw-blade on the center of rotation of the cap-plate.

7. The combination of a cap-plate for rotating cylindrical saw-blades, a multiplicity of holders adapted to draw and hold one edge at a number of different points of a saw-blade against one surface of the cap-plate and means in said cap-plate whereby saw-blades of varying diameters may be supported therein.

8. The combination of a cap-plate for rotating cylindrical saw-blades, a multiplicity of holders adapted to draw and hold one edge at a number of different points of a saw-blade against one surface of the cap-plate, means in said cap-plate whereby saw-blades of varying diameters may be supported therein and means supported by the cap-plate whereby a saw-blade is maintained in circular form.

9. The combination of a cap-plate for rotating cylindrical saw-blades, a multiplicity of holders adapted to draw and hold one edge at a number of different points of a saw-blade against one surface of the cap-plate, means in said cap-plate whereby saw-blades of varying diameter may be supported therein, means supported by the cap-plate whereby a saw-blade is maintained in circular form, and means supported by the cap-plate for readily centering each saw-blade on the center of rotation of the cap-plate.

GEORGE N. WILLIAMS, Jr.
JULIUS WEGNER.

Witnesses:
A. H. BOWIE,
JOHN D. SHERMAN, Jr.